United States Patent
Hundley et al.

(10) Patent No.: US 12,420,339 B1
(45) Date of Patent: Sep. 23, 2025

(54) METHODS FOR ROCKET FUEL GRAIN COATING AND UNITARY MANUFACTURE

(71) Applicant: X-Bow Launch Systems Inc., Albuquerque, NM (US)

(72) Inventors: Jason Hundley, Albuquerque, NM (US); Mark Kaufman, Auburn, CA (US); Michael McPherson, Socorro, NM (US); Jillian Marsh, Austin, TX (US)

(73) Assignee: X-Bow Launch Systems Inc., Albuquerque, NM (US)

( * ) Notice: Subject to any disclaimer, the term of this patent is extended or adjusted under 35 U.S.C. 154(b) by 161 days.

(21) Appl. No.: 17/325,543

(22) Filed: May 20, 2021

Related U.S. Application Data (60) Provisional application No. 63/049,056, filed on Jul. 7, 2020, provisional application No. 63/027,887, filed on May 20, 2020.

(51) Int. Cl.
*B22F 10/28* (2021.01)
*B29C 64/153* (2017.01)
*B29C 64/393* (2017.01)

(52) U.S. Cl.
CPC ............ *B22F 10/28* (2021.01); *B29C 64/153* (2017.08); *B29C 64/393* (2017.08)

(58) Field of Classification Search
CPC ...... B22F 10/28; B29C 64/153; B29C 64/393
See application file for complete search history.

(56) References Cited

U.S. PATENT DOCUMENTS

| | | | |
|---|---|---|---|
| 6,590,403 B1* | 7/2003 | Gramer | H01C 3/08 324/71.2 |
| 9,453,479 B1* | 9/2016 | Jones | F02K 9/08 |
| 9,822,045 B2* | 11/2017 | Jones | C06B 45/105 |
| 11,434,180 B2* | 9/2022 | Wallace | C06B 21/0033 |
| 2018/0169937 A1* | 6/2018 | Jones | B29C 64/118 |

* cited by examiner

*Primary Examiner* — John A Hevey
(74) *Attorney, Agent, or Firm* — Temmerman Law; Mathew J. Temmerman (57) ABSTRACT

A method for making a unitary fuel grain for use in a rocket motor or gas generator comprising forming a fuel grain coating substantially free of gas-permeable voids, forming a succession of additional coats of oxidizer depleted grain material substantially free of gas-permeable voids. The fuel grain is then deposited into a print bed along a predetermined distance in a direction primarily parallel to a rocket motor central axis, the fuel grain coating forming a rocket motor fuel grain having a pre-ignition segment and a post-ignition segment, wherein the passivated fuel grain coating of fuel grain material is continuously self-adhered during fuel grain material deposition, and wherein the fuel grain material comprises oxidizer depleted fuel grain material; and wherein the passivated fuel grain coating of fuel grain material forms a substantially circular pattern upon deposition, said substantially circular pattern having an outer shell with an undulating pattern.

8 Claims, 2 Drawing Sheets

METHODS FOR ROCKET FUEL GRAIN COATING AND UNITARY MANUFACTURE

RELATED APPLICATIONS

This application claims priority from the United States provisional application with Ser. No. 63/027,887, which was filed on May 20, 2020, and from the United States provisional application with Ser. No. 63/049,056, which was filed on Jul. 7, 2020. The disclosure of each provisional application is incorporated herein as if set out in full.

STATEMENT REGARDING FEDERAL SPONSORED RESEARCH OF DEVELOPMENT

Portions of the invention described herein were made in the invention was made under a contract with an agency of the United States Government. The name of the U.S. Government agency and Government contract number are: US ARMY ACC-APG-RTP W911NF, Contract no. W911NF19C. The government may have certain rights in the inventions disclosed herein.

TECHNICAL FIELD

This disclosure is primarily related to methods of continuously and additively manufacturing rocket fuel grains, rocket fuel grain coatings, and unitary rocket fuel grains improved in numerous respects over the art, including environmental footprint, ease of manufacture, and cost. These benefits derive from both efficient manufacturing and an enhanced motor fuel grain design. To safely achieve this construction, a fused deposition additive manufacturing apparatus, modified to shield the nanocomposite material from the atmosphere, is used.

BACKGROUND

The present invention relates generally to rocket propulsion systems and specifically to solid rocket motors. Conventionally designed hybrid rocket motors using cast-molded solid fuels like hydroxyl-terminated polybutadiene (HTPB), a form of synthetic rubber that has been the most studied hybrid rocket motor fuel to date, are rarely if ever employed for applications requiring vibration free, consistent high performance. Unfortunately, conventionally designed hybrid rocket motors using cast-molded HTPB as well as other cast-molded solid fuels, including paraffin wax, polyamides, and thermoplastics have not been able to demonstrate the vibration free, consistent, high performance required for most rocket propulsion applications. Recent advances in methods for additive manufacturing have enabled much more complex geometries in recent years. Using additive manufacturing, for example, hybrid fuel chambers can be designed and printed to include complex chamber geometries that were previously too difficult or impossible to achieve with traditional casting methods. Recent publications demonstrate the use of complex chambers geometries resulting in significant performance increases.

There are several types of additive manufacturing processes that can be used to manufacture fuels. A few common processes include Fused Deposition Modeling (FDM) or "Fused Beading Additive Manufacturing machine", Selective Laser Sintering (SLS), Stereolithography (SLA, and Laser Spray Modeling (LSM). Relatedly, a laser spray nozzle assembly is described in U.S. Pat. No. 4,724,299. This assembly includes a nozzle body, a housing, a cladding powder passage, and a cladding powder supply system that is operably associated with the passage such that the powder exits the opening coaxial with a laser beam. Notably, while FDM, SLS, SLA, and LSM processes represent some of the most common and most inexpensive forms of additive manufacturing, in many cases these processes provide for inferior material densities, limited scaling capabilities, poor repair capabilities, mechanical joint limitations, and/or machinability issues.

Prior art methods and processes are further known to produce excessive construction waste, require excessive labor, expend excessive energy and, in general, suffer from diminished production efficiencies. Prior art construction and manufacturing methods also typically alter the coefficient of thermal expansion, thereby introducing heterogeneity into thermal expansion rates, causing stress fractures, cracks and material fatigue such as bending or bowing. Further, there is a need for optimizing contact surface areas in order to maximize thermal energy transfer, reduce material requirements and thereby also reduce weight requirements. Finally, there is a need for 3D construction with capabilities of the highest thermal effectiveness, highest temperature allowances, highest pressure allowances, highest compactness, highest erosion resistance, and highest corrosion resistance.

While the present invention contemplates a wide variety of fuel grain forms, it is notable that rockets using hybrid propulsion systems often offer advantages over rockets using solid or liquid systems. For example, using a hybrid propulsion system for a rocket allows for thrust termination, rocket motor restart, and throttling capabilities. Furthermore, hybrid propulsion systems are inherently immune to explosion. Immunity to explosion is of great importance to rocket-powered vehicle designers that hope one day to operate their suborbital and orbital spaceplanes alongside jet-powered vehicles at public use airports. Finally, rockets with hybrid propulsion systems typically have a less complex design with a potentially higher reliability, and are also comparably less costly to develop, manufacture, and operate than the other rockets. The solid fuel grain of a hybrid rocket is typically formed by either casting melted sold fuel within a fuel motor case or by separately casting the fuel grain in a mold. In the latter instance, the solid fuel grain is "cartridge-loaded" into a motor case after the molding process. In this manufacturing method, the nozzle is engineered to be separated from the case to allow such loading. In another variation of this method, the solid fuel grain may be separately molded in multiple sections, allowing easier handling.
Prior Art Fuel Chamber Designs Recent studies have investigated a variety of performance enhancing geometries and have demonstrated significant increases in regression rates compared to simple straight chamber geometries. Each of said geometries utilize a different technique to manipulate the oxidizer flow. A first prior art example concerns a composite fuel system utilizing a printed acrylonitrile butadiene styrene (ABS) tabulator structure cast with paraffin. Regression rates for the turbulator were measured using conventional methods. In this case, the added turbulator was shown to increase regression rates by an average of 35%, although a small sample size of testing was performed.

In a related publication, star swirl fuel chamber designs using an acrylic fuel and gaseous oxygen were employed, achieving regression rates of an average of 250% greater over the standard cylindrical straight chamber design. This effect was seen to increase with each turn per inch for each swirl design tested.

Additional star swirl chambers are known in the art that utilize ABS and N2O. The related publications describe notable increases in regression rates over straight chambers for similar oxidizer mass fluxes. Further, these publications demonstrate a potential regression rate increase of up to 67% for the star swirl over straight chamber designs. However, this study was also shown to slightly decrease the ignition efficiency by as much as 15% for some tests.

Relatedly, a study investigating the performance of a helical swirl design to enable larger fuel surface burning area without increasing the length of the fuel grain involved the printing of helical fuels in ABS and the oxidizer was N2O. The helical swirl design increased regression rates by up to 130% when compared with straight chamber fuels at the same oxidizer flux. For post burn regression analysis, USU first sectioned the fuel, then the cross sections were imaged to recreate a computerized mesh of the burned grain. The average radius was then calculated to obtain the average regression rate for the burn.

Conventional cast manufactured hybrids have made use of performance enhancing additives in their formulations. These additives can increase regression rates through enhanced radiation, enhanced heat transfer, as well as increased density. One prior art system has shown that the regression rate of HTPB with GOX oxidizer can be increased by the inclusion of 5% (by weight) 100 nm sized aluminum particles.

It is known that particle size is a key factor in performance enhancement. Micron sized particles increase regression rates by enhancing the radiation heat flux from the ignition flame to the fuel surface. Nano-scale aluminum particles additionally have lower ignition temperatures and higher specific area, releasing energy closer to the surface.

Relatedly, it has been shown that the use of Lithium aluminum hydride (LiAlH4, LAH) and Magnesium hydride (MgH2, MGH) nanoparticles significantly increases the regression rate of a paraffin-based fuel used with a gaseous oxygen oxidizer. Further, an increase in performance has been shown using a mixture comprised of pure HTPB with a 10% Al—Cu powder composition. In one case demonstrating an increase in regression rate of up to 37% compared to the standard HTPB fuel.

Prior Art Fuel Grain Structures

Additive manufacturing of hybrid fuels has also enabled the design of hollow grain structures which can then be filled with another fuel. The printed structure can be designed as a matrix that releases pockets of the supplemental fuel. The secondary, tertiary, and quaternary fuels may have increased performance properties and their use is enabled by the printed grain structure. In addition, thrust profiles can be improved by custom tailoring fuel formulations such that the fuels burn through various sections of varying energy densities.

It has been shown that a printed grain matrix structure may be filled with powdered fuels such as coal, graphite and/or aluminum. The completed fuel may be roughly 50% ABS and 50% powdered fuel by volume. Voids may be optimized to achieve maximum powdered fuel mass while ensuring the ABS structure does not prematurely collapse. Meaningful increases in thrust levels in addition to novel 3D-printable components have been described. A related technique which utilizes a printed grain structure that releases liquid fuel rather than powdered fuel has been stated to potentially increase regression rates by up to 100%.

Additional techniques for achieving performance increases have also been explored. These include using a swirl injector and mixing additives injected into the cast fuel. Some work has also been done exploring the effect of compounding these techniques along with complex fuel chambers. In some cases, this has led to additional performance increases in regression rates. For example, the turbulator grain design can be combined with a paraffin/aluminum fill mixture, in addition to a swirl oxidizer injector, in order to increase regression rates.

Prior Art 3D Printing and Testing Capabilities

Additive manufacturing, or 3D printing, refers to a variety of different processes. The most common method of additive manufacturing for printing complex fuel chambers in recent studies has been fused deposition modeling (FDM). In the FDM process, the fuel is printed coat by coat. In the FDM process, a roll of polymeric filament is continuously fed through a hot end, which melts the material and bonds the material to the previous coat. Once a coat is completed, the extruder raises to complete the next coat. This process repeats for each coat until the final coat is completed.

Advantages of FDM include low cost, ease of use and the availability of open source hardware and software. Ideal FDM printers are capable of printing very fine structures, for example, ABS fuel filaments. ABS has a high print temperature of 240 degrees Celsius, and requires a controlled thermal environment to prevent warping. In addition, heated beds are necessary to ensure that the ABS will adhere to the build plate and maintain sufficient temperature to prevent premature cooling and warping.

In one example, the MakerBot 3D printer from Johnson and Johnson 3D Printing Laboratory may be used, but it does not contain heated beds and is limited to printing PLA filament. Therefore, a dedicated 3D printer for producing ABS fuels is often preferable. For example, a Creality Ender 3 with a glass heated bed is known in the art to print the ABS fuels and ABS-type fuels with high efficiency.

In other examples, additive manufacturing (AM) has been implemented in the printing of rocket components, rocket fuel grains, and the like. Indeed, AM has enabled design of fuel grains with complex chamber geometries which are not possible or very difficult to achieve through conventional casting techniques. In some examples, said chamber geometries may be adapted to increase or decrease oxidizer flow rates.

Also provided are energetic materials suitable for use in the present invention are a class of material with high concentrations of stored chemical energy that may be released. Highly energetic materials include, for example, ultrafine aluminum powder, the particle size of which may vary from micron to nanoscale, including particles that are a composite of aluminum and polymer in nanoscale. As known by those skilled in the art, generally a nanocomposite is a material comprising two or more constituent solids, the size of which measures 100 nanometers (nm) or less.

Prior art examples include but are not limited to hot-fire experiments of printed fuels in addition to additive manufacturing techniques for ABS+Aluminum complex chamber fuels grain, the later resulting in successful tests for a 3D printed ABS+Aluminum hybrid rocket fuel grain. In some embodiments, the present invention does not require use of ABS+ and is suitable for use with a variety of oxidizers and used with nearly any raw material.

SUMMARY OF THE INVENTION

Methods are provided herein for the additive manufacture of various rocket motor fuel grains and the like. In one embodiment, said methods provide unitary fuel grains comprising a metallic core and an epoxide-based oligomer coating surrounding the core. In other embodiments, said methods involve the encasement of an ignition port defining a substantially circular cross-section and comprising an oval shape, a polygonal shape, a quatrefoil shape, a star shape, an irregular shape, or even a shape co-designed by an artificially intelligent computerized fuel grain mixing device.

Compositions for a wide variety of fuel grains, rocket fuels, and oxidizers are contemplated. In one example, nano-scale aluminum fuel grain coatings are provided, wherein the nano-scale aluminum particle cores are encapsulated in a polymer based oligomer coating. In some embodiments, said fuel grain coatings providing for an exothermic ignition reaction, wherein normative regression rates are achieved, thereby improving launch safety and reducing costs. In some examples, a step of embedding the unitary fuel grain in an insulating fibrous material is contemplated. In some examples, a post-ignition segment includes a vortex inducer channel ("VIC"), that is geometrically configured to enhance oxidizer vortex flow. In other embodiments, depleted oxidizer grains may be utilized for various purposes, including dampening vortex flow.

Also provided herein are acrylonitrile butadiene styrene (ABS) thermoplastics having a prearranged monomer composition. Typically, a predetermined mixture ratio is mixed with a third compound and/or a blended ABS thermoplastic with polymer-infused nanocomposite aluminum powder. In one example, a first compound comprises 95% by mass ABS thermoplastic and the second compound comprises 5% by mass polymer-infused nanocomposite aluminum powder. In some embodiments, a second compound comprising a plurality of nanoscale elemental aluminum core particles encapsulated by a cap of oligomer polymer. Further provided is a second compound including a polymer-infused nanocomposite aluminum powder.

An exemplary solid fuel grain suitable for use in a hybrid rocket motor and made in accordance with the present invention has a generally cylindrical shape and defines a center port that runs linearly through its length. The solid fuel grain is formed as a fused stack of layers with each layer comprising a plurality of abutting, fused concentric generally circular, disposed beads of material suitable as a hybrid rocket fuel, with each such concentric generally circular shaped bead thus formed, depending upon the additive manufacturing process used, as a ring with a defined cross sectional shape. The plurality of ring-shaped disposed beads is configured in a concentric pattern of increasing radii arrayed around the center port or center opening and made from extruding and disposing a formulation of thermoplastic-nanocomposite aluminum material.

After being loaded into a hybrid rocket motor's solid section, concurrent with ignition actuation to elevate the temperature within the center port above the thermoplastic fuel's ignition or glass transition temperature and the nano-composite aluminum's ignition temperature, a liquid or gaseous oxidizer is introduced into the solid fuel grain through one or more multiple injectors along a pathway defined by the center port causing a thin layer of the center port wall to phase change from solid to gas vapor.

Using a thermoplastic fuel formulation such as 95% by mass Acrynotrile Butadiene Styrene (ABS) and 5% NmX-01 nanocomposite aluminum, phase change will occur from solid to gas vapor along the exposed surface area of the solid fuel grain port wall. The resulting combined fuel vapor and nanocomposite aluminum then mixes with the oxidizer to form a fuel/oxidizer mixture suitable for rocket motor ignition. The resulting combusted reaction mass is expelled at high temperature and pressure through the rocket motor's nozzle (conventional de Laval or aerospike) at supersonic speed to generate thrust.

Each layer, comprised of a plurality of fused concentric circular beaded structures of different radii, exhibits a geometry that is designed to expose more surface area along the center port wall for ignition than would otherwise be possible if the center port wall were of a smooth, uniform cast-molded design. During hybrid rocket motor operation, starting with the center port wall and working outward, each beaded concentric ring structure, after undergoing phase change and ablation, is replaced by the next abutting beaded concentric ring structure. This process is repeated and persists throughout the rocket motor's operation until either the oxidizer flow is terminated, or the solid fuel is exhausted.

Unlike prior art constructions that attempt to increase regression rate using cast-molded multi-port grain architecture featuring smooth port walls at the sacrifice of fuel loading, increased fuel waste, and induced excessive vibration, the additively manufactured solid fuel grain of the present invention supports smooth, consistent rocket motor operation at regression rates previously unobtainable in a single port design. Further, by replacing cast-molding production methods with additive manufacturing methods, grain flaws chronic to both cast-molded fuel grains made from HTPB and paraffin wax are eliminated.

Another exemplary solid fuel grain suitable for use in a hybrid rocket motor and made in accordance with the present invention is formed as described in the above exemplary example, but with each concentric beaded ring structure possessing a pattern that both increases the surface area available for ignition and creates, in its plurality of fusion stacked layers, a rifling type pattern within the port wall designed to induce oxidizer swirling flow around the center port axis line rather than laminar or streamline flow; thereby, creating a vortex within the center port to enable oxidizer and gaseous fuel to spend more time within the center port to mix and combust more thoroughly than would otherwise be possible. in the above examples, the pattern thus engineered into the fuel grain topology will persist throughout the rocket motor's operation until either oxidizer flow is terminated, or the solid fuel is exhausted.

In contrast, the solid fuel grain of the present invention supports smooth, consistent rocket motor operation at regression rates and at Isp levels previously unobtainable in hybrid rocket motors. Higher energetic ignition, on the order of 50% or higher than hybrid fuel grains using aluminum oxide capped micron particle size aluminum additive, enables rocket motor designers the opportunity to design hybrid rocket motors with significantly reduced propellant loading to meet dimensional restrictions and performance requirements for many rocket powered vehicle applications that heretofore, developers would not consider a hybrid rocket motor. To achieve such a construction, the solid fuel grain is preferably manufactured using any one of several available fused deposition type additive manufacturing machines capable of fabricating articles in a formulation of thermoplastic fuel and nanocomposite aluminum additive.

In some embodiments, mathematical models including artificially intelligent models and neural networked models are utilized to carry out various non-routine manufacturing steps. In one example, artificially intelligent mathematical models facilitate mixing of aluminum fuel grains. This represents a novel manufacturing method, and in some embodiments may not require ABS. Notably, the rate that fuel will burn in a unitary system is not necessarily proportional to the amount of oxidizer flowing through the port. The inventors have determined in this case that the oxidizer to fuel ratio may be maintained at a relatively constant value in use, thereby decreasing the variance in regression rates over time.

It is a first objective of the present invention to provide a novel manufacturing method that does not require ABS in some embodiments.

It is another objective of the invention to provide a 3D-printable rocket fuel grain that is unitary and continuous in construction, thereby improving ballistics profiles, strength, and versatility.

It is another objective of the invention to lower development costs by way of improving the safety and simplicity of additively manufactured rockets.

It is another objective of the invention to eliminate gas-permeable voids in the hybrid fuel grains during the deposition process.

It is yet another objective of the invention to achieve normative regression rates to improve launch safety and launch aerodynamics.

It is yet another objective of the invention to enhance oxidizer vortex flow in use via mechanical or chemical means.

These and other advantages and features of the present invention are described with specificity so as to make the present invention understandable to one of ordinary skill in the art. The foregoing and other objects and features of the disclosure will become more apparent from the following detailed description, which proceeds with reference to the accompanying figures.

DETAILED DESCRIPTION OF THE INVENTION

The present invention is directed to additively manufactured propulsion technologies, unitary rocket fuel grain fabrication systems, solid propellant materials, and methods of producing solid propellant elements. In some embodiments, the present invention relates to a method of production of a solid fuel grain for a hybrid rocket motor having a fuel grain chamber and geometric shape that induces the flow of oxidizer as it passes through the fuel grain chamber. In some embodiments, the invention is directed to methods of unitary fuel grain manufacture, novel motor grain design, fuel grain coating compositions, improved fuel gains and oxidizers, in addition to methods of automating rocket motor and rocket fuel grain manufacture. Although the term rocket motor is used primarily throughout this document, "rocket engine" and "gas generator" may be interchanged with this term.

In some embodiments, methods may also be provided for making a unitary fuel grain with novel motor grain characteristics. In some embodiments, unitary fuel grains may be constructed via standard 3D-printing methods, including via continuous deposition type additive manufacturing apparatus. In the preferred embodiment, the disclosed method of production includes a construction platform capable of moving in XYZ directions, controlled by step motors, construction platforms, print heads, and the like.

Figure 1A:
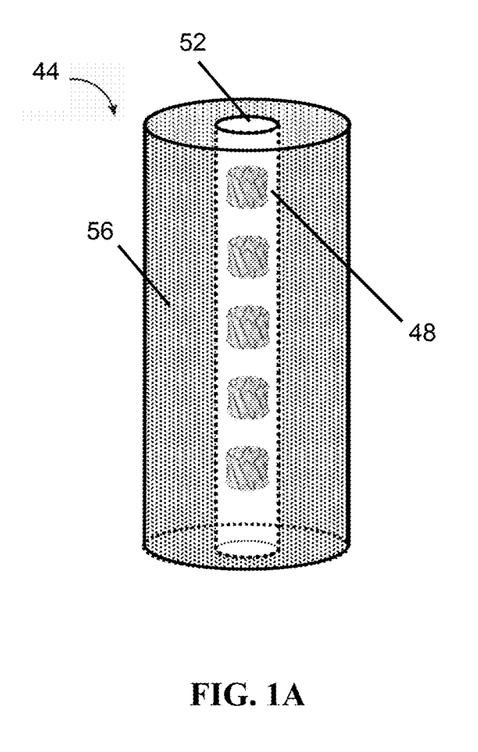
FIG. 1A depicts a rocket motor fuel grain section comprised of a unitary fuel grain and a passivated fuel grain coating according to one embodiment of the present invention.

Below, various improved fuel grain compositions are disclosed. Also, the manufacture of unitary fuel grains and the construction of related rocket systems is explored. As shown in FIG. 1A and more specifically in FIG. 2A, said rocket motors 40 have a pre-ignition segment 68 and post-ignition segment 76 described above. FIG. 1A shows a fuel grain section 44 having a cylindrical shape, although a wide variety of fuel grain shapes and patterns may be achieved. In some examples, a pre-ignition segment 76 is oriented opposite to the "payload" end of said rocket (termed the "energetics cap 60").

Figure 1B:
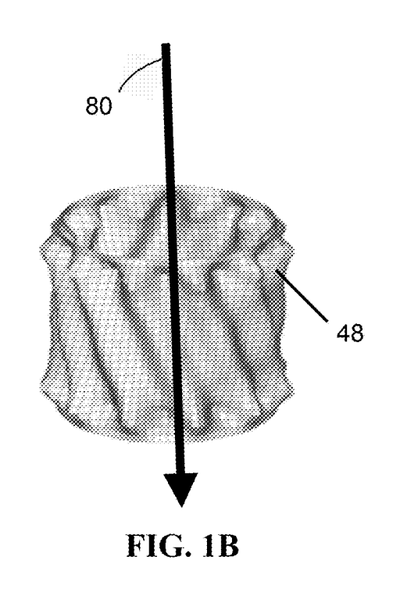
FIG. 1B depicts a fuel grain cross-section oriented along the central rocket motor axis according to one embodiment of the present invention.
Figure 2A:
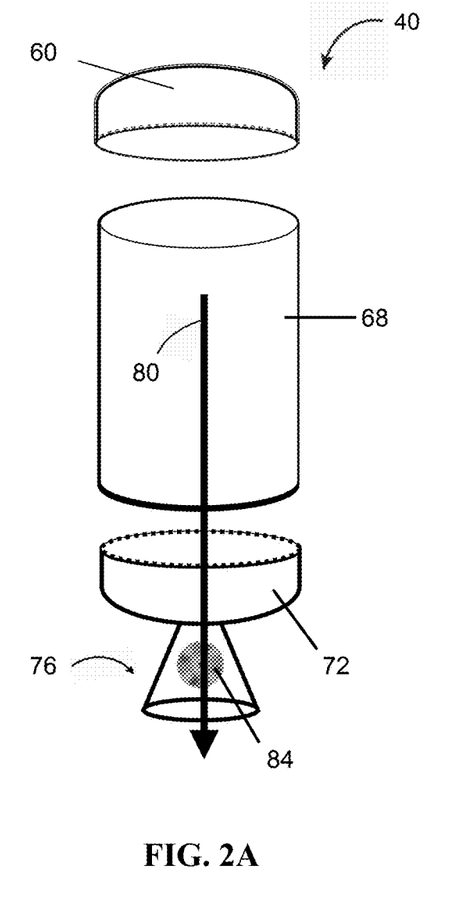
FIG. 2A is an exemplary rocket motor and its components according to one embodiment of the present invention.
Figure 2B:
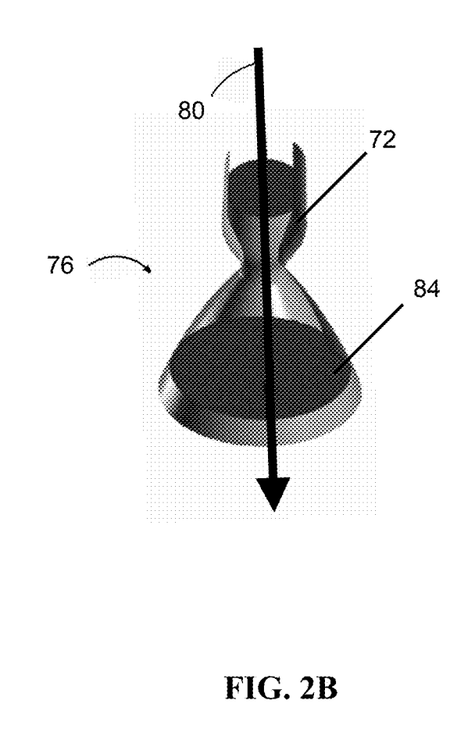
FIG. 2B depicts an exploded view of post-ignition segment of the above exemplary rocket motor according to one embodiment of the present invention.

FIG. 2A is an exemplary rocket motor including an energetics cap 60, ignition port 68, and other component parts. Further provided is a rocket motor 40 comprising an ignition port 52, outer shell 56, and energetics cap 60. Further provided is a fuel grain section 44 wherein undulations form a progressive twist through the ignition port thereby forming a helical grooved rifling pattern of undulations to induce a swirling gaseous flow within the center port. FIG. 1B depicts a generally cylindrical or tubular unitary fuel grain, while FIG. 2B is a post-ignition segment aligned parallel to a central rocket motor axis.

In some embodiments, the fuel grain section 44 includes post-ignition segment 76 contains an energetics cap 60 at a distal end, an outer shell 68, a pre-ignition section, and post-ignition segments. in some embodiments. Said shell 68 houses, in part, the fuel grain coatings described above. In some examples, the energetics cap 60 may comprise embedded electrodes and various sensors. As depicted in FIG. 2B, the exemplary rocket also includes a vortex inducer channel 72 ("VIC") and a post-ignition segment 76 at the end of the rocket motor body. As described above, FIG. 2B depicts a post-ignition segment 76 which, in some examples, includes a vortex inducer channel 72 ("VIC"), that is geometrically configured to enhance oxidizer vortex flow 84, or alternately is adapted to toggle into a non-vortex type flow mode via software controls.

In other embodiments, oxidizer is applied along a pathway defined by the ignition port 52 (abbreviated herein as "CUG"), with ignition occurring along the exposed surface area of the fuel grain section 44. In other embodiments, rocket motors comprised said unitary fuel grain benefit not only from improved efficiency and decreased costs during production, but the smooth curved surface provided by said unitary fuel grain (also referred to herein as, "UFG") can improve airflow across the unitary fuel grain surface of the rocket in use. Unlike prior art constructions the fuel grain section 44 of the present invention allows a smooth burning process whereby an uncombusted surface is continually provided as ignition continues. In some examples, this process continues until either the fuel grain or oxidizer is exhausted.

Although the fuel grain section 44 may be manufactured in various sizes or dimensions, in one exemplary embodiment, the fuel grain section 44 has an external diameter, d, of not less than 30 inches. Although a wide range of diameters are possible, the ignition port 52 has an initial diameter, d1, of at least 3.0 inches in this exemplary embodiment. Each of the fuel coatings may have a thickness of up to 0.006 to 0.016 inches, with such coating thickness at least partially dependent on the particular fuel grain coating construction apparatus used in manufacturing the unitary fuel grain 44.

Notably, it is very recently known in the art that experiments directed toward the development of paraffin-based hybrid rocket fuels that burn at regression rates greater than those of conventional hybrid rocket fuels like hydroxyl-terminated butadiene. The basic approach followed in this development is to use materials such that a hydrodynamically unstable liquid layer forms on the melting surface of a burning fuel body. Entrainment of droplets from the liquid/gas interface can substantially increase the rate of fuel mass transfer, leading to surface regression faster than can be achieved using conventional fuels. The higher regression rate eliminates the need for the complex multi-port grain structures of conventional solid rocket fuels, making it possible to obtain acceptable performance from single-port structures. The high-regression-rate fuels contain no toxic or otherwise hazardous components and can be shipped commercially as non-hazardous commodities. Among the experiments performed on these fuels were scale-up tests using gaseous oxygen. The data from these tests were found to agree with data from small-scale, low-pressure and low-mass-flux laboratory tests and to confirm the expectation that these fuels would burn at high regression rates, chamber pressures, and mass fluxes representative of full-scale rocket motors.

Compositions are provided that include passivated fuel grain coatings comprising a highly incendiary fuel grain section 44 are employed. In the preferred embodiment, the passivated fuel grain coating comprises said highly incendiary rocket motor fuel grain such that the induction of an exothermic ignition reaction is highly reproducible and readily achieves normative regression rates. In other embodiments, achieving said normative regression rates enhances rocket ballistics profiles and/or rocket launch-related safety measures.

In some examples, pressure sensitive microsensors may be embedded into the pre-ignition segment 68 of said rocket motor, said microsensors providing real-time data to a user regarding: automated launch abort protocols, atmospheric pressures, rocket body integrity, and rocket thrust profiles. In some embodiments, said microsensors and miniature rocket motors may be constructed using standard non-toxic fuel grain coating fuel grain construction implements. Said fuel grain coating construction apparatus may comprise an electron beam fuel grain coating construction apparatus in one embodiment of the present invention. In other embodiments, a non-toxic dissolvable unitary fuel grain is formed by combining: (a) the passivated fuel grain coating of fuel grain material with, (b) dissolvable core elements; and wherein the non-toxic dissolvable unitary fuel grain comprises a central unitary fuel grain ignition port.

Said apparatus is capable of fabricating articles in a polymeric material suitable for a hybrid propulsion system. For instance, circularized coatings of the fuel grain section 44 may be formed on an electron beam-construction machine manufactured and distributed by Stratasys, Inc., of Eden Prairie, Minn. and marketed under the trade name, Maxum™. The Maxum™ electron beam-construction machine is one of several models of FDM machines manufactured by Stratasys, Inc. It is capable of producing near net-shape articles in wax, acrylonitrile butadiene styrene (ABS) thermoplastic, and other standard raw materials. Because the build envelope of the Maxum™ electron beam-construction machine is of insufficient volume to fabricate most solid fuel grains in one piece, a complete solid fuel grain may be formed in the fuel grain sections 44 and only later assembled into a functional form.

In some examples, different commercially available electron beam-construction machines could also be used without departing from the spirit and scope of the present invention, including, but not limited to, electron beam-construction machines manufactured and distributed by 3D Systems, Inc. of Rock Hill, S.C.; EnvisionTEC GmbH of Gladbeck, Germany; and Objet Geometries, Ltd. of Rehovot, Israel. Similarly, various polymeric materials could be used without departing from the spirit and scope of the present invention, including, but not limited to polycarbonate; ABS/polycarbonate blends, polyphenylsulfone, and/or proprietary materials.

Also provided by the present disclosure are exemplary methods for manufacturing fuel grain sections 44. Notably, the electron beam-construction process begins with two cartridge mechanisms. One cartridge stores a spool of thermoplastic that is used for the fuel grain section 44. The second cartridge stores a spool of water-soluble disposable material that is used to separate the fuel grain section 44 from a support base and support any overhanging structures specified in the design. An example of an appropriate water-soluble disposable support material is WaterWorks™, which is also manufactured and distributed by Stratasys, Inc., of Eden Prairie, Minn.

Once the electron beam-construction process has commenced, monofilament lines are spooled out from each cartridge and are fed into melting elements (not shown) housed in a module, with such melting elements heating the mono filament lines to their respective melting temperatures. The resulting melted thermoplastic and support material is then forced through respective injection nozzles so as to form small diameter beads of material that are laid down in a unitary (i.e., continuous) fashion.

In some examples, the melting elements and respective injection nozzles are robotically controlled by software systems (including neural networks, AI, and augmented reality software systems) to allow for movement along two axes (X, Y) in a plane. In some examples, the construction platform can drop a substantial distance during operation including least a distance equal to the specified coat thickness after each successive coating has been formed. In another example, the thermoplastic material is extruded and placed to form each successive unitary coat according to the chosen design of the fuel grain section 44.

In some embodiments, as each coating decreases in temperature and hardens, a chemical and structural bond forms between coating layers. Notably, the fuel grain section 44 may formed in this manner in a continuous fashion as described above. In one example, ignition port is removed from the electron beam-construction machine and placed into a water solution to dissolve and remove any ancillary raw material. In one example, an electron beam-fabricated fuel grain section 44 has a substantially uniform fuel grain density and is substantially free of voids. Furthermore, the fuel grain section 44 will normally require only minimal surface treatment in preparation for assembly. In some examples, during construction a plastic sheet is mounted to a robotically controlled platform that moves along a central rocket motor axis 80 substantially perpendicular to a module housing liquefiers and/or respective injection nozzle.

In some examples, a construction platform may be utilized that moves along the rocket motor central axis 80 housing liquefiers and injection nozzles. Notably, such a construction platform can drop a distance equal to the specified layer thickness after each successive fuel grain coating segment has been deposited. In one example, a construction platform for a 3D printer for constructing unitary fuel grains includes an exterior layer that configures to a bowed segment of a circumferential wall of a unitary fuel grain, the unitary fuel grain being substantially circular in at least one dimension and having a top, bottom, and cylindrical circumferential wall, wherein the construction platform includes mechanized sections that displace the unitary fuel grain away from the construction platform.

In some embodiments, 5% aluminum is introduced in the feedstock with the assistance of an artificially intelligent controller ("AIC") and/or a neural networked controller ("NNC"). In one example, the AIC comprises a mathematical method translated in computer-readable instructions, the computer-readable instructions serving the technical purpose of controlling an aluminum feedstock mixer ("AFM"). Alternatively, NNC may facilitate said non-routine mixing, benefitting deep-learning algorithms enabling NNC-assisted control of the aluminum cooling process following the aforementioned AIC mixing steps. In another embodiment, NNC comprises a mathematical method translated in computer-readable instructions, the computer-readable instructions serving the technical purpose of wirelessly enhancing digital sensor signals exchanged between unitary hybrid rocket motors in flight users analyzing said flight from the ground.

Also provided are control algorithms comprising software for controlling the supply of raw materials to the nozzles. In one example, software takes into account 3D-printing extrusion factors, said 3D-printing extrusion factors comprising varied raw material viscosities in addition to mechanical variance in the operation of different nozzles. Also provided by the present disclosure is a construction platform comprising a semi-helical support structure segment and/or a semi-cylindrical support segment.

In some embodiments, novel software is utilized to ensure that the unitary fuel grain is configured in a contiguous manner. This represents a novel manufacturing method, and in some embodiments does not require standard materials such as ABS. Notably, the rate that fuel will burn in a unitary system is not necessarily proportional to the amount of oxidizer flowing through the port. Rather, the oxidizer to fuel ratio is maintained relatively constant during the burn, unlike a situation a larger surface area is pursued in order to increase the regression rate of the fuel grain in use.

It is shown herein that the rate that fuel will burn is not necessarily proportional to the amount of oxidizer flowing through the port; the oxidizer to fuel ratio is maintained at a relatively constant rate during the burn. As described herein, "normative regression rate(s)" is used herein to refer to regression rates that do not vary substantially over time. In other words, normative regression rates maintain a relative constant value relative to a mean calibrated value and as compared to the art.

As described above, methods are provided for continuous extrusion of unitary fuel grains having novel motor grain designs, including progressive star swirl patterns forming the outer shell of the rocket motor a star comprising a progressive. Relatedly, a construction platform may be utilized that moves along the rocket motor central axis 80 housing liquefiers and injection nozzles. In some embodiments, said construction platform is fire-retardant and retrofitted with augmented reality features including glasses displaying electronic information to a user, said augmented reality user interfaces permitting the real-time display of ballistics profiles, sensor feedback data, temperature readings, and an integrated chat feature, all visualized on the lenses of a user. As described above, in one embodiment such a construction platform can drop a distance equal to the specified layer thickness required after each successive fuel grain coating segment has been deposited.

It is shown herein that the unitary fuel grain 44 may be preferably wrapped in a film made of phenol or other suitable material. Once wrapped in the film, the solid fuel grain can be placed into a motor case of a rocket. In general, said film may act as an insulation coat to reflect heat and prevent damage to fuel grains made from non-metallic materials. In some embodiments, the pre-ignition segment 68 is centralized and has a substantially star-shaped cross section and/or a helical-shaped cross section. In particular examples, a pre-ignition segment 68 may be centralized and may comprise a non-circular cross-section.

In some examples, VIC 72 is embedded with various electrodes and sensors that may facilitate flight and monitoring of a rocket launch. Regarding oxidizer vortex flow 84, in some examples unitary fuel grain patterns may induce oxidizer vortex flow 84 persisting throughout the rocket motor's operation as the fuel is consumed. Alternately, in other embodiments depleted oxidizer grains (also referred to herein as "oxidizer depleted grain material") may be utilized to dampen vortex flow 84. In some embodiments, various surface patterns are contemplated, each surface pattern inducing a unique aerodynamics profile in use.

In some examples, computer programs are contemplated to facilitate elimination of gas-permeable voids formed during the deposition process. In one example, said gas-permeable voids (or "gaps") may be filled with an electrically operated propellant or energetic gas-generating material. As depicted in FIG. 2B, the exemplary rocket also includes a vortex inducer channel 72 and a post-ignition segment 76 at the end of the rocket body opposing the energetics cap 60. In some examples, the pre-ignition segment 68 is centralized and has a substantially circular-cross section. In particular examples, a pre-ignition segment 68 may be centralized and may comprise a non-circular cross-section.

In the preferred embodiment, the inventors have determined the invention to include at least additive manufacturing nozzle (hereafter referred to as "nozzle"), said at least one nozzle generally contained within a print head(s). Multiple print heads are contemplated, one to tailor the inert composition and the other to be focused on the energetic itself. The nozzles are used for extruding or otherwise depositing material for the components of the device. Raw materials for the components may be stored in reservoirs that are operatively coupled to supply materials to the respective nozzles. Notably, in some embodiments, the nozzles and print heads are adapted to extrude high viscosity fuels.

In some embodiments, the nozzles may have different configurations, and may require different treatments of their respective materials. Further, the print heads are adaptable for use with various nozzle diameters and/or nozzle flow feed mechanisms (such as different rates of feeding raw material) in order to extrude different materials layer by layer. In other embodiments, the present invention is configured to handle materials of heterogenous viscosity. Further, processing speeds are modifiable on-demand and the present invention is generally adapted for use with a wide range of operable speeds. Further, the nozzles may handle a wide range of material volume, and/or may deposit materials of very high-viscosity relative to conventional systems.

In some embodiments, the nozzles may move together as a single unit with the print head. Further, supply of material to one or more of the nozzles at various locations may be used to deposit the distinct materials precisely where each material is needed. Alternatively, one or more of the nozzles may be moved separately from the others. In another embodiment, one nozzle successively translocates in space to deposit different types of material in rapid succession, in order to successively build up a single heterogenous layer. In summary, the above processes may be characterized by continuous variation over time through one or multiple nozzles.

To aid in controlling the content of water and/or glycerol (or other solvent) in the extruded material, the energetic material nozzle may be heated to a high temperature. In some embodiments, the nozzle may be heated to a temperature that is at least that of the boiling point of the solvent (such as glycerol and/or water) that is in the baseline propellant material but is below a temperature at which the baseline propellant material decomposes. The decomposition may involve a heat-producing chemical reaction.

In some embodiments, decomposition may allow for removal of solvent material while still preserving the capability of the extruded material to function as a propellant (to later undergo the chemical reaction between the fuel and the oxidizer that produces propellant products such as pressurized gases). In addition, in some embodiments chemical reaction of the fuel and the oxidizer during the manufacturing process is undesirable in that it produces heat and ignition products, which can damage the manufacturing system. In some embodiments the nozzle comprises an energetic material nozzle that may be heated by any of a variety of suitable mechanisms, many of which may be integrated into printer heads. For instance, the nozzle may be electrically heated, with the electrical heating controlled by a suitable a feedback mechanism that controls the temperature of the nozzle.

Also provided is a unitary fuel grains adapted to use with the above least one nozzle wherein oxidizer depleted fuel grain material may include at least one chemical component suitable for an exothermic ignition reaction. Further, the fuel grain coating may form a rocket motor fuel grain having a pre-ignition and/or post-ignition segment as described above. In one example, a fuel grain coating comprises a substantially circular shape, wherein the fuel grain coating may form an outer shell 56, said outer shell 56 comprising an undulating pattern.

In some embodiments, the at least one nozzle is adapted to extrude high viscosity fuels, and wherein the at least one nozzle is configured to move in sync with said at least one print head. In some embodiments, a three-dimensional printer may be capable of utilizing the above nozzles to dispense up to ten different raw materials (i.e., not limited to ABS). Further, the present system is capable of self-adhering materials of varying viscosity. In some examples, a surface coating comprising a unitary fuel grain is turbulent over a large portion of the length of the rocket.

In some embodiments, methods of modulating rocket regression rates in real-time via an AI-adapted construction platform are contemplated. In some embodiments, said platform comprises an artificially intelligent a feedstock mixing apparatus wherein the feedstock mixing apparatus is operatively connected to a computing system, said computing system being configured to simultaneously analyze feedstock mixing parameters. Competitive simulations comprise instruction sets and subroutines of a competitive simulation computer program, the instruction sets and subroutines being stored on storage device and coupled to a computer, said instruction sets and subroutines being executed by one or more processors and one or more memory architectures provided within said computer. In some embodiments, the artificially intelligent feedstock mixer autonomously analyzes launch parameters, feedstock mixing parameters, and the like. Typically, the feedstock mixing parameters would include characteristics such as characteristic velocity, chamber volume, ignition efficiency, and oxidizer mass flow. In short, said competitive simulations can nearly instantaneously determine how much ignition additive to mix into the feedstock in order to immediately impact regression rates of a rocket in flight.

Also provided are surface coatings that may be introduced to a diffusion flame shield that extends over the entire length of the fuel grain 44, melting the exposed surface of a solid or hybrid fuel grain, thereby causing a liquid rocket fuel coating to form. In one example, evaporation via the liquid-gas equilibrium produces a continuous flux of fuel gas that mixes with oxidizer at the flame shield to maintain ignition along the exposed surface area of the solid fuel grain abutting the ignition port 52. At equilibrium the regression rate of the melt surface and the liquid-gas interface are the same and the thickness of the liquid fuel coating is constant.

Notably, in some embodiments gas may become trapped in various voids during construction. As a consequence, one may utilize an inert shielding gas in order to enhance ignition. For example, carbon dioxide will contribute oxygen to the ignition reaction whereas argon, an inert noble gas, will not. Further to the above, in some embodiments a heavier-than-air inert or non-nanocomposite aluminum reactive gas may be utilized to cover a print bed and a nozzle of the additive manufacturing apparatus.

Also provided are depleted oxidizer fuel grains including minimized volumes of oxidizer (either a liquid or a gas) injected into a motor case along a pathway defined by the ignition port and flows over the solid fuel grain, forming a boundary layer over the solid fuel grain. As described herein, the boundary layer is usually turbulent over a large portion of the length of the port. Within the boundary layer is a turbulent diffusion flame sheet that extends over the entire length of the solid fuel grain above the surface of the solid fuel grain, melting the exposed surface of the solid fuel grain, and causing a liquid fuel layer to form.

In some examples, evaporation from the liquid-gas interface produces a continuous flow of fuel gas that mixes with oxidizer at the flame sheet to maintain ignition along the exposed surface area of the solid fuel grain adjacent to the central unitary fuel grain ignition port. At steady state, the regression rate of the melt surface and the liquid-gas interface are the same and the thickness of the liquid layer is constant. Because the surface pattern increases the surface area, the exemplary solid fuel grain has the increased regression rate and corresponding thrust impulse without the decreased fuel volumes associated with multi-port designs. In some examples, the unitary coats (also referred to herein as "unitary rocket motor coats", "unitary fuel grain material", or "unitary rocket motor coatings") are substantially comprised of a rocket motor fuel grain suitable for an exothermic ignition reaction, and wherein normative regression rates enhance launch safety and launch aerodynamics.

Methods of "unitary fuel grain" manufacture are also provided according to in one embodiment of the present invention. In one embodiment, methods for continuous unitary fuel grain construction are provided, involving the combined construction of insulation, adhesives, liners, propellants, and the like. In other embodiments.

In one embodiment the system describes a nanoparticle comprises a) a core comprising a metal; b) a coating surrounding the core, wherein the coating comprises an epoxide-based oligomer; and c) wherein the metal is Al, Mg, Cr or Fe.

One of ordinary skill in the art will recognize that additional embodiments are also possible without departing from the teachings of the present invention or the scope of the claims which follow. This detailed description, and particularly the specific details of the exemplary embodiments disclosed herein, is given primarily for clarity of understanding, and no unnecessary limitations are to be understood therefrom, for modifications will become obvious to those skilled in the art upon reading this disclosure and may be made without departing from the spirit or scope of the claimed invention.

Although the invention has been shown and described with respect to a certain preferred embodiment, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any particular application.

We claim:

1. A method of making a unitary fuel grain for use in a rocket motor or gas generator, comprising:
   (a) applying a fuel grain coating upon a fuel grain core selected from a metallic fuel grain core, a non-metallic fuel grain core, or a nanoparticle fuel grain core; wherein the coating is substantially free of gas-permeable voids following application and has a thickness of 0.006 to 0.016 inches;
   (b) depositing a succession of coats of oxidizer depleted material onto the fuel grain coating to form a continuous fuel grain coating bonded to the fuel grain core;
   (c) wherein the fuel grain core is passivated by steps (a) and (b);
   and the passivated fuel grain is deposited into a print bed of an additive manufacturing apparatus such that it continuously self-adheres during deposition without the use of external bonding agents along a predetermined distance in a direction primarily parallel to a rocket motor central axis; wherein the oxidizer depleted material includes at least one atomized constituent suitable for an exothermic ignition reaction;
   (d) wherein, following deposition, the passivated fuel grain forms a unitary fuel grain having a pre-ignition segment and a post-ignition segment; the post-ignition segment comprising a vortex inducer channel (VIC) embedded with sensors configured to assist flight and monitoring; and
   (e) wherein the unitary fuel grain forms a substantially circular cross-sectional pattern upon deposition.

2. The method of claim 1 wherein said fuel grain core includes dissolvable core elements, and the unitary fuel grain is formed by combining:
   the passivated fuel grain with dissolvable core elements; and wherein the unitary fuel grain comprises an ignition port.

3. The method of claim 2, wherein the ignition port has an initial diameter of about 4 inches prior to during an ignition process.

4. "The method of claim 1 wherein the additive manufacturing apparatus comprises a Fused Beading Additive Manufacturing machine and/or Selective Laser Sintering machine".

5. The method of claim 1 wherein an ignition port extends through the unitary fuel grain and has an initial diameter of about 4 inches prior to an ignition process.

6. The method of claim 5 wherein the ignition port forms a star-shaped pattern when view at the cross section; and
   wherein undulations form a progressive twist through the center ignition port thereby forming a helical grooved rifling pattern of undulations to induce a swirling gaseous flow within the center port.

7. The method of claim 3 wherein a shape of the ignition port comprises a circular shape, an oval shape, a polygonal shape, a quatrefoil shape, a star shape, or an irregular shape.

8. The method of claim 1 wherein the fuel grain core is metallic,
   further comprising the steps of:
   shrink-wrapping the unitary fuel grain in plastic film to insulate the unitary fuel grain from an ambient atmosphere prior to removing the unitary fuel grain from the print bed of the additive manufacturing apparatus; and including a step of embedding the unitary fuel grain in protective film.

* * * * *